(12) United States Patent
Coronado et al.

(10) Patent No.: US 7,716,437 B2
(45) Date of Patent: May 11, 2010

(54) DYNAMIC TIMER CONFIGURATION FOR TASK MONITORING IN A REMOTE MIRROR AND COPY ENVIRONMENT

(75) Inventors: Juan Alonso Coronado, Tucson, AZ (US); Dinh Hai Le, Tucson, AZ (US); Jayson Elliott Tsingine, Tucson, AZ (US); Warren Keith Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/831,532

(22) Filed: Jul. 31, 2007

(65) Prior Publication Data

US 2009/0037677 A1 Feb. 5, 2009

(51) Int. Cl.
*G06F 12/00* (2006.01)
(52) U.S. Cl. .................. 711/162; 711/112; 711/114; 711/154; 707/204; 713/502; 714/5; 714/15; 714/47
(58) Field of Classification Search .............. 711/162, 711/112, 114, 154; 707/204; 713/502; 714/5, 714/15, 47
See application file for complete search history.

(56) References Cited

U.S. PATENT DOCUMENTS 5,550,991 A * 8/1996 Keener et al. ............... 710/311
6,304,980 B1 * 10/2001 Beardsley et al. ............. 714/6
7,024,584 B2 * 4/2006 Boyd et al. ................... 714/6
7,409,510 B2 * 8/2008 Werner et al. .............. 711/156
7,523,204 B2 * 4/2009 D'Costa et al. ............ 709/226
2005/0050392 A1 * 3/2005 Baba et al. ................. 714/25
2009/0037676 A1 * 2/2009 Coronado et al. .......... 711/162

* cited by examiner

*Primary Examiner*—Stephen C Elmore
(74) *Attorney, Agent, or Firm*—Kunzler Needham Massey & Thorpe

(57) ABSTRACT

A system is disclosed that includes a host system to issue a write command, a primary storage device to write data to a primary volume, and a secondary storage device to mirror the data to a secondary volume. A task timer may be initiated upon sending the data from the primary storage device to the secondary storage device. The secondary storage device may also send an acknowledge signal to the primary storage device in the event it successfully mirrors the data to the secondary volume. In the event the acknowledge signal is not received before the timer expires, the primary storage device may notify the host system that the primary and secondary volumes are in a suspended state. To alter the duration of the timer, the host system may be further configured to dynamically alter the duration of the timer by sending a command to the primary storage device.

8 Claims, 3 Drawing Sheets

DYNAMIC TIMER CONFIGURATION FOR TASK MONITORING IN A REMOTE MIRROR AND COPY ENVIRONMENT

BACKGROUND OF THE INVENTION

1. Field of the Invention

This invention relates to data storage devices and more particularly to systems and methods for dynamically configuring timers used to monitor tasks in a remote mirror and copy environment.

2. Description of the Related Art

In a remote mirror and copy environment, whenever a primary (i.e., source) storage controller mirrors data to a secondary (i.e., target) controller, the primary controller monitors the state of the secondary controller. The primary controller may utilize a task timer to monitor the state of the secondary controller in a peer-to-peer remote copy (PPRC) relationship.

Conventionally, the task timer in the primary storage controller has been hard coded to a certain value. Analysis of several critical field problems, however, has led to the discovery that the problems may have been prevented or mitigated if the task timer had a different value than the hard coded value. Consequently, some customers may desire a task timer that has a value greater than the hard coded value. This may reduce the likelihood that a suspended condition will occur when a secondary volume undergoes a lengthy error recovery process. Other customers, by contrast, may desire a task timer with a reduced value so the suspended condition occurs more frequently. This may prevent application I/O from building up while a secondary storage controller undergoes a lengthy recovery process.

Currently, the only way a customer can change the value of the task timer is using a peek-and-poke capability. The peek may be used to view the current value of the task timer and the poke may be used to modify the value. When microcode in the primary controller detects a poke event, the microcode may replace the default value with a user-selected value. By design, the task timer value may be persistent across initial microcode loads, warmstarts, and failure conditions in the storage controller.

Although a peek-and-poke process may provide a way to modify the task timer value, it may still not be flexible enough to satisfy customer needs. Modifying the value may require user intervention and thus may be impossible to modify in real time. In addition, the peek-and-poke capability may be susceptible to errors because the timer value must normally be set in all clusters of one or more primary controllers, and the wrong variable may be poked. Poking the wrong variable may cause unpredictable behavior or even catastrophic failures in the storage system.

In view of the foregoing, what is needed is a system and method to dynamically alter the value of the timer used to monitor tasks in a remote mirror and copy environment. Ideally, the system and method could be used to modify the value in real time without requiring user intervention. Similarly, the system and method would ideally enable the timer value to be dynamically modified for different applications.

SUMMARY OF THE INVENTION

The present invention has been developed in response to the present state of the art, and in particular, in response to the problems and needs in the art that have not yet been fully solved by currently available systems and methods. Accordingly, the present invention has been developed to provide improved systems and methods to dynamically control a task timer in a remote mirror and copy environment.

In a first aspect of the invention, a system in accordance with the invention may include a host system to issue a write command to a primary storage device. The primary storage device may receive the write command and, in response, write data to a primary volume associated with the primary storage device. The primary storage device may also send a copy of the data to a secondary storage device and initiate a timer upon sending the copy. The secondary storage device may receive the copy of the data from the primary storage device and mirror the data to a secondary volume associated with the secondary storage device. The secondary storage device may also send an acknowledge signal to the primary storage device in the event it successfully mirrors the data to the secondary volume. In the event the acknowledge signal is not received before the timer expires, the primary storage device may notify the host system that the primary and secondary volumes are in a suspended state. To alter the duration of the timer, the host system may be further configured to dynamically alter the duration of the timer by sending a command to the primary storage device.

In selected embodiments, the host system may be configured to dynamically alter the timer duration for different applications running on the host system. In other embodiments, the host system may be configured to dynamically alter the duration of the timer to correspond to other timers operated by the host system. In selected embodiments, the command is configured to modify the timer duration for at least one of a single volume pair, multiple volume pairs, and all volumes in a logical subsystem.

In another aspect of the invention, a method to dynamically control a task timer in a remote mirror and copy environment may include issuing a write command and writing data to a primary volume in response to the write command. An attempt may then be made to mirror the data to a secondary volume. A timer may be initiated upon attempting to mirror the data. In the event the data is successfully mirrored to the secondary volume, an acknowledge signal may be provided. In the event the timer expires before the acknowledge signal is provided, the primary and secondary volumes may be suspended. The method may further include dynamically altering the duration of the timer by issuing a command.

The present invention provides novel systems and methods for dynamically altering a task timer value in a remote mirror and copy environment. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
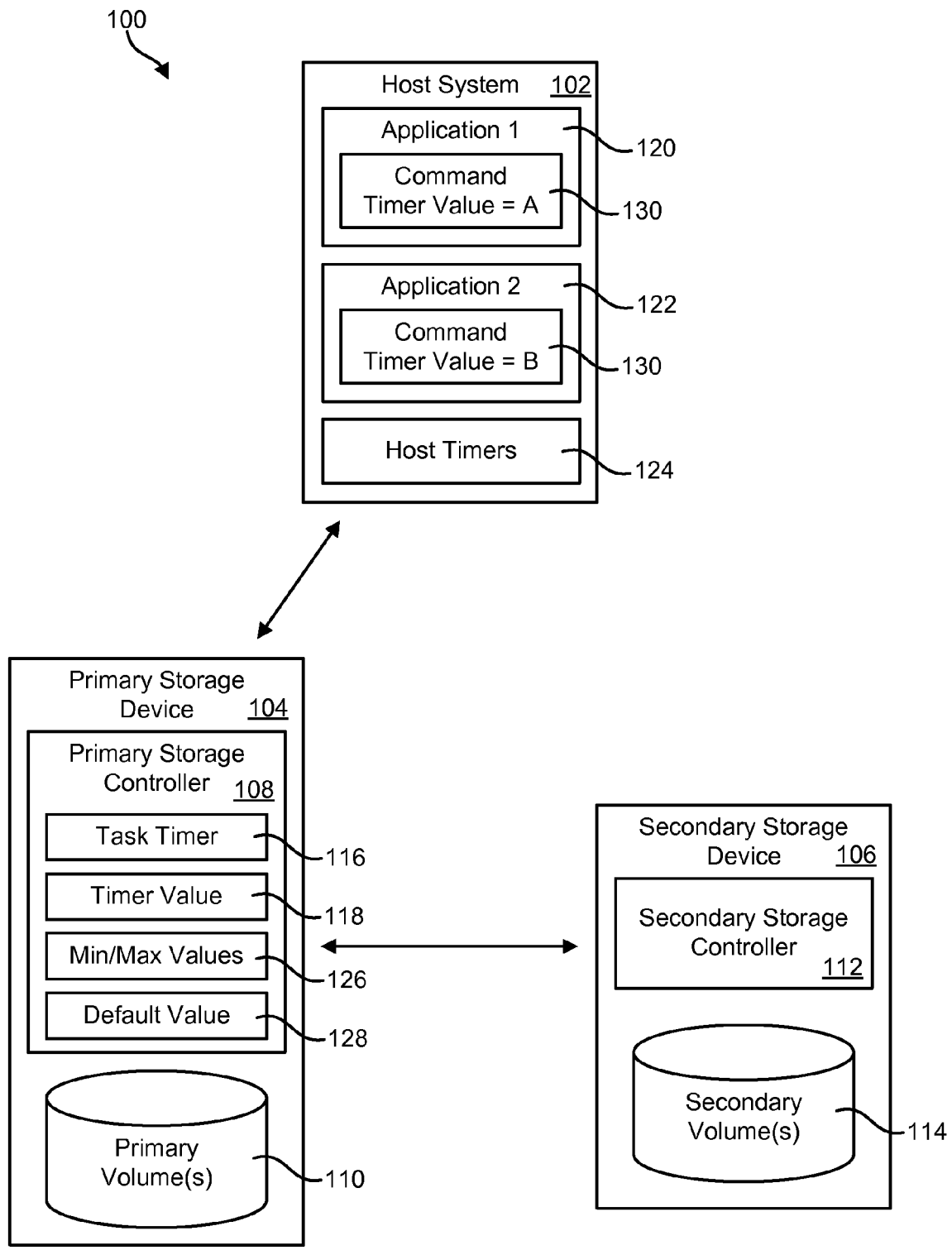
FIG. 1 is a high-level block diagram illustrating one embodiment of a system for dynamically altering a task timer value in a remote mirror and copy environment.

Referring to FIG. 1, in selected embodiments, a system 100 in accordance with the invention may include a host system 102, a primary storage device 104, and a secondary storage device 106. A host system 102 may be configured to write to the primary storage device 104, which may include a primary storage controller 108 and one or more primary volumes 110 associated with the primary storage controller 108. Whenever data is written to the primary storage device 104, the data may be mirrored to a secondary storage device 106, which may include a secondary storage controller 112 and one or more secondary volumes 114. To keep the data in the volumes 110, 114 consistent, the system 100 may utilize a protocol such as Remote Mirror and Copy, Peer-to-Peer Remote Copy (PPRC), or other similar protocol.

In selected embodiments, whenever a primary storage controller 108 mirrors data to the secondary controller 112, the primary controller 108 may monitor the state of the secondary volumes 114. In certain embodiments, the primary controller 108 may utilize a task timer 116 to monitor the state of the secondary volumes 114.

For example, a task timer 116 may be used to monitor the state of the secondary volumes 114 by measuring the I/O response time from the primary controller 108 to the secondary controller 112. If, due to a hardware or software problem, the secondary controller 112 fails to respond to the primary controller 108 before the timer 116 expires, the primary storage controller 108 may initiate its recovery process. The primary storage controller 108 may also suspend the secondary volumes 114 and report to the host 102 that the volumes (i.e., the primary and secondary volumes 110, 114) are suspended.

When the host 102 has been notified that the volumes 110, 114 are suspended, the host 102 may invoke its recovery procedure. For example, in a count-key-data (CKD) host environment, a recovery procedure called HyperSwap may be invoked. This procedure sends a freeze command to the primary storage controller 108 and the primary storage controller 108 in turn freezes all I/O to the volume pairs in the logical subsystem associated with the suspended volume. HyperSwap will then cause the host 102 to swap to the secondary storage controller 112. In essence, this causes the secondary storage controller 112 to become the primary storage controller 108.

The duration of the task timer 116 may be controlled by a timer value 118. Unlike the hard-coded value described previously, the timer value 118 may be modified using a command 130 (e.g., PPRC Task timer) in accordance with the invention. This command 130 may provide a way for the host system 102 to manage and control the duration of the task timer 116.

Using this command 130, a host 102 may adjust the duration of the task timer 116 in real time. In selected embodiment, the command 130 may enable a host 102 to adjust the duration of the task timer 116 for different applications 120, 122. For example, the duration of the task timer 116 may be reduced when backing up a critical database. Likewise, the duration of the task timer 116 may be increased when backing up a non-critical database.

In other embodiments, the command 130 may allow the host system 102 to adjust the duration of the task timer 116 to correspond to one or more timers 124 of the host system 102. For example, an IBM S/390 host may set the duration of the timer 116 to correspond to a Missing Interrupt Handler (MIH) timeout value or to a Geographically Dispersed Parallel Sysplex (GDPS) timer.

In selected embodiments, the timer value 118 may be limited to a range of values. For example, if a command 130 attempts to set the timer duration above a maximum value 126 or below a minimum value 126, the microcode of the primary storage controller 108 may set the timer value 118 to a maximum or minimum value 126 closest to the desired value. Alternatively, the microcode may set the timer value 118 to a default value 128 between the maximum and minimum values 126.

In selected embodiments, the command 130 may be designed to provide selection granularity. For example, a first timer value 118 may be designated for Metro Mirror applications, whereas a different timer value 118 may be designated for Global Copy applications. Similarly, in other embodiments, the command 130 may be designed so that the host system 102 may designate a timer value 118 for a single volume pair, multiple volume pairs, or all volumes in a logical subsystem.

Figure 2:
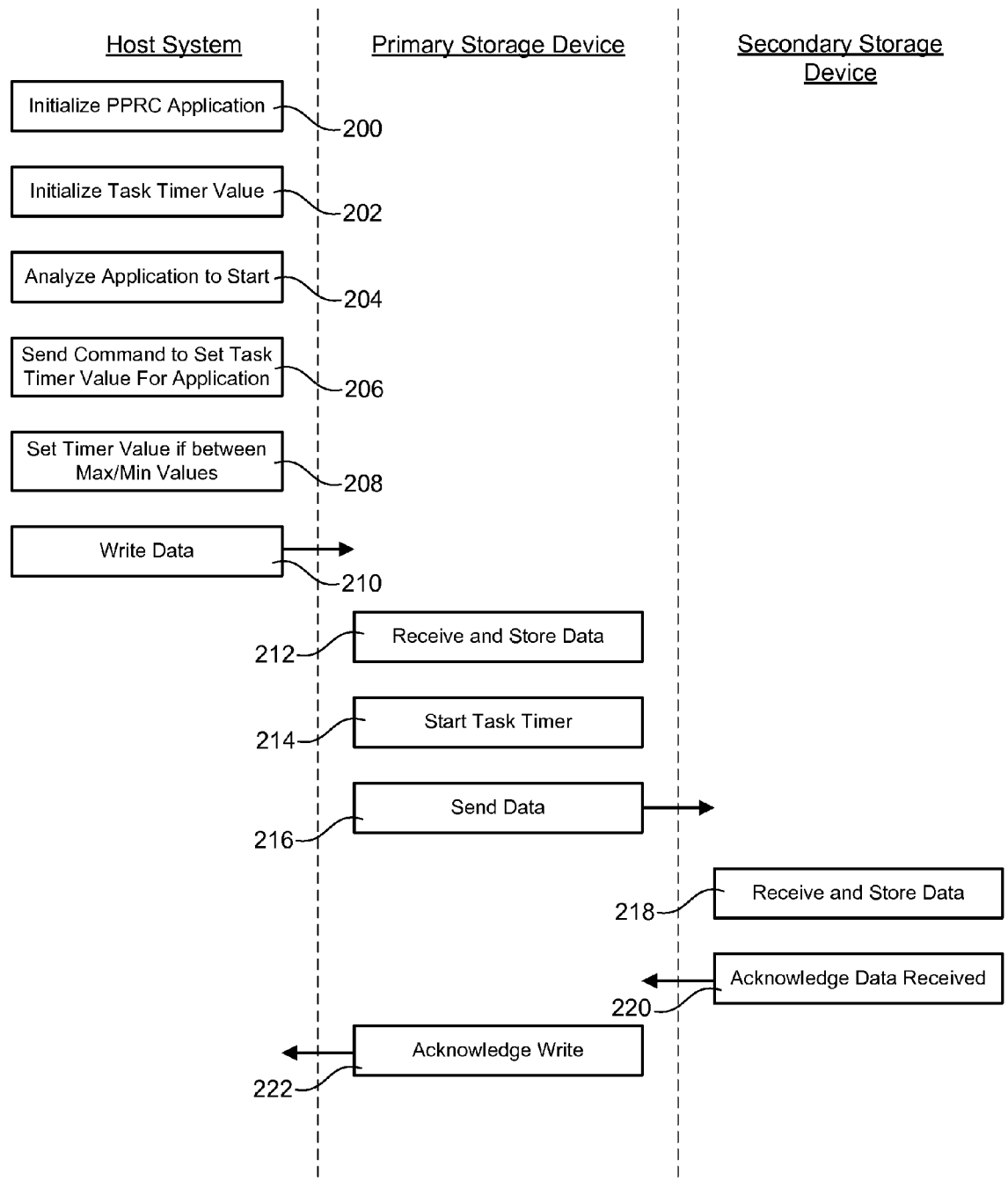
FIG. 2 is a flow chart illustrating one scenario that may be encountered by the system illustrated in FIG. 1.

Referring to FIG. 2, in a first scenario, a host system 102 may begin by initializing 200 a PPRC application and initializing 202 a task timer value 118, such as with the default value 128. The host 102 may then analyze 204 an application to start on the host system 102 and send 206 a command to set the task timer value 118 to a value that is desired for the application. If the timer value is between the maximum and minimum values 126, the primary storage controller may set 208 the timer value 118 to that indicated by the host 102. If the timer value is not between the maximum and minimum values 126, the primary storage controller may set 208 the timer value 118 to a value between the maximum and minimum values, such as to the default value 128.

The host system 102 may then attempt to write data 210 to the primary storage device 104. The primary storage device 104 may receive 212 and store 212 the data. The primary storage device 104 may start 214 the task timer 116 and send 216 a copy of the data to the secondary storage device 106 to mirror the data to the secondary volumes 114. Prior to expiration of the timer 116, the secondary storage device 106 may store 218 the data in the secondary volumes 114 and send 220 an acknowledge signal to the primary storage device 104. The primary storage device 104 may then send 222 an acknowledge signal to the host system 102 indicating that the write operation has successfully completed.

Figure 3:
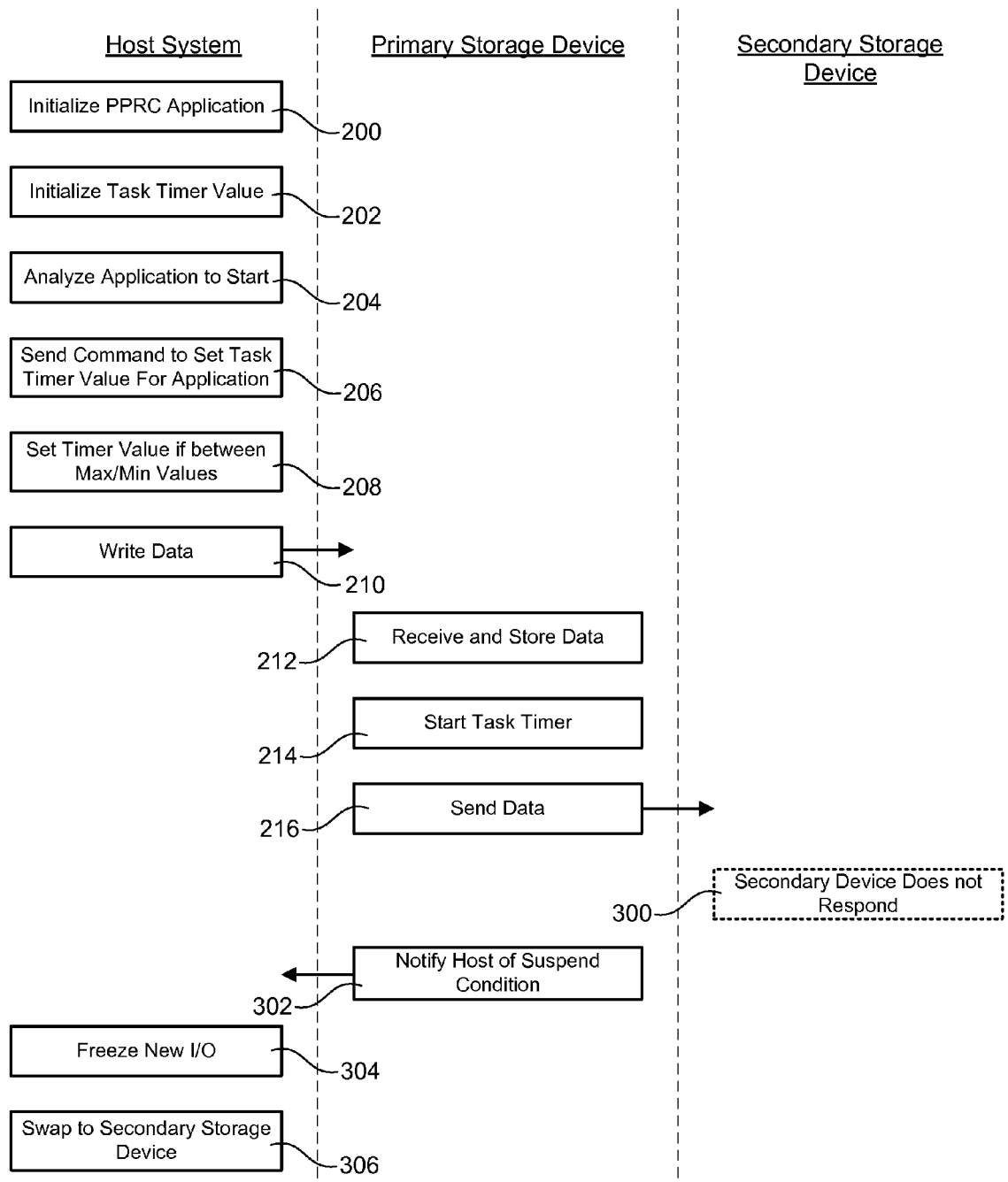
FIG. 3 is a flow chart illustrating another scenario that may be encountered by the system illustrated in FIG. 1.

Referring to FIG. 3, in another scenario, the host system 102 may perform the same steps 200, 202, 204, 206, 208 described in association with FIG. 2. The host system 102 may then attempt to write 210 data to the primary storage device 104. The primary storage device 104 may receive 212 and store 212 the data and then send 214 a copy of the data to the secondary storage device 106 to mirror the data to the secondary volumes 114. The primary storage device 104 may start 214 the task timer 116 at this time.

In this scenario, if the secondary storage device 106 does not respond 300 before the task timer 116 expires, the primary storage device 104 may notify 302 the host 102 that the primary and secondary volumes 110, 114 are in a suspended state. At this point, the host 102 may invoke its recovery procedure. In selected embodiments, this recovery procedure may include freezing 304 all I/O to the volume pairs in the logical subsystem that are in the suspended state. In certain embodiments, the recovery procedure may also include swapping 306 to the secondary storage device 106, effectively making the secondary storage device 106 the primary storage device 104.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to dynamically alter a task timer value in a remote mirror and copy environment, the system comprising:
    a host system to issue a write command to a primary storage device;
    the primary storage device configured to receive the write command and, in response, write data to a primary volume associated with the primary storage device;
    the primary storage device further configured to send a copy of the data to a secondary storage device and initiate a timer upon sending the copy;
    the secondary storage device configured to receive the copy of the data from the primary storage device and mirror the data to a secondary volume associated with the secondary storage device;
    the secondary storage device further configured to send an acknowledge signal to the primary storage device in the event it successfully mirrors the data to the secondary volume;
    the primary storage device further configured notify the host system that the primary and secondary volumes are suspended in the event the acknowledge signal is not received before the timer expires; and
    the host system further configured to dynamically alter the duration of the timer by sending a command to the primary storage device.

2. The system of claim 1, wherein the host system is configured to dynamically alter the timer duration for different applications running on the host system.

3. The system of claim 1, wherein the host system is configured to dynamically alter the duration of the timer to correspond to other timers operated by the host system.

4. The system of claim 1, wherein the command is configured to modify the timer duration for at least one of a single volume pair, multiple volume pairs, and all volumes in a logical subsystem.

5. A method to dynamically alter a task timer value in a remote mirror and copy environment, the method comprising:
    issuing a write command;
    writing data to a primary volume in response to the write command;
    attempting to mirror the data to a secondary volume;
    initiating a timer upon attempting to mirror the data;
    providing an acknowledge signal in the event the data is successfully mirrored to the secondary volume;
    suspending the primary and secondary volumes in the event the timer expires before the acknowledge signal is provided; and
    dynamically altering the duration of the timer by issuing a command.

6. The method of claim 5, wherein dynamically altering the duration of the timer comprises dynamically altering the duration of the timer for different applications.

7. The method of claim 5, wherein dynamically altering the duration of the timer comprises dynamically altering the duration of the timer to correspond to other timers operated by a host system.

8. The method of claim 5, wherein dynamically altering the duration of the timer comprises dynamically altering the duration of the timer for at least one of a single volume pair, multiple volume pairs, and all volumes in a logical subsystem.

* * * * *